United States Patent [19]

Winkler

[11] 4,449,089
[45] May 15, 1984

[54] BATTERY CHARGERS

[76] Inventor: Harry L. Winkler, Box 632, Pinehurst, Id. 83850

[21] Appl. No.: 321,920

[22] Filed: Nov. 16, 1981

[51] Int. Cl.³ .............................................. H02J 7/00
[52] U.S. Cl. .................................................... 320/15
[58] Field of Search ................. 307/10 R; 320/2, 5–7, 320/9, 15, 19

[56] References Cited

U.S. PATENT DOCUMENTS

| 3,646,422 | 2/1972 | Hankley | 307/10 R |
| 3,654,538 | 4/1972 | Gardberg | 320/7 |
| 3,763,415 | 10/1973 | Ownby | 320/6 |
| 3,900,784 | 8/1975 | Seike | 320/6 |
| 4,082,992 | 4/1978 | Day | 320/6 |

Primary Examiner—A. D. Pellinen

[57] ABSTRACT

A battery charger designed to be installed in a vehicle, and while utilizing a portion of this vehicle's electrical system, can be used to charge another vehicle's battery or batteries. This battery charger has a polarity sensor, and when properly connected to an external battery will automatically switch away from charging the internal battery to charging the external battery or batteries. And, when dis-connected from the external battery or batteries will automatically switch back to charging the internal battery, thus making it an automatic vehicle to vehicle battery charger.

7 Claims, 1 Drawing Figure

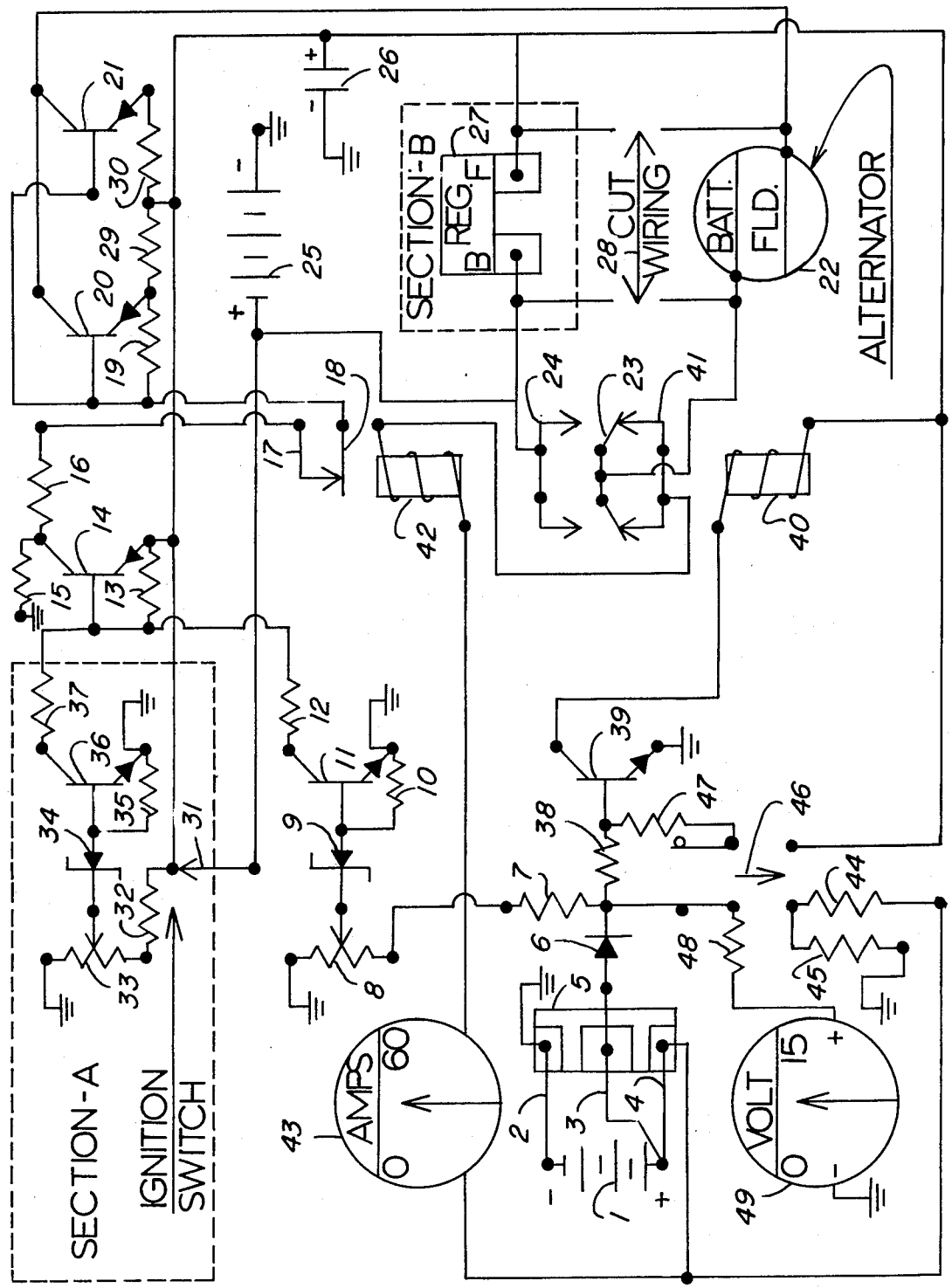

BATTERY CHARGERS

BACKGROUND OF THE INVENTION

From time to time it is desirable to charge a vehicle's battery or batteries without removing said batteries from said vehicle. Since it is impossible to always be around 110 volt AC power to operate an AC battery charger, the object of my invention was to design a battery charger to be installed in one vehicle and while installed in said vehicle, enables you to charge other vehicles' batteries, when needed, making this a vehicle to vehicle battery charger. Further object of my invention was to make this battery charger with a number of desirable features, as will become obvious further in the embodiment.

SUMMARY OF THE INVENTION

Even though the vehicular battery charger was especially designed to charge external batteries you will find that it spends most of it's time maintaining the charge on the internal battery until it is needed to charge an external battery. Following is an explanation of how it maintains the charge on the internal battery; First I'll go the route using the vehicle's regulator (shown on the drawing as section B). The power relay has two sets of dual points. This relay is spring loaded to stay in one position and while in this position connects the alternator output to the internal battery. This system uses two output power transistors, PNP type, with the base biassed through resistors to ground, and with the collectors connected to the field terminal on the alternator. In actual operation, the regulator plays the same role as it did before installation of the vehicular battery charger, as it still controls the alternator's output. It does this in the following way; When the vehicle's ignition switch is turned ON, positive voltage appears on the field terminal of the regulator and from here it goes to the emitters of the two output power transistors, thus making the base biased more negative with respect to the emitters causing the transistors to switch on, then power is transferred from the emitters to the collectors and on to the field terminal of the alternator. In return . . . if the regulator's field terminal voltage increases, the alternator's output increases, or if the regulator's field terminal voltage de-creases, the alternator's output de-creases.

This vehicular battery charger uses either section A or section B . . . BUT NEVER BOTH AT THE SAME TIME.

Next, I'll explain section A on the drawing which is the voltage sensor that maintains the charge on the internal battery as this voltage sensor (section A) takes the place of the vehicle's regulator (section B). The voltage sensor has a voltage divider. If adjusted to maintain 14 volts on the internal battery and the battery voltage drops under 13.9 volts, the battery charger will produce full power on the output. But, when the battery voltage goes over 13.9 volts, voltage passes through the Zener diode causing the transistor #36 to turn on which causes transistor #14 to switch on and in return, this reduces the power transistors #20 and #21 output. So, if the battery voltage increases more, so does the voltage that goes through the Zener diode, causing the power transistors' output to decrease more. Thus the upper limits of the internal battery's voltage is maintained from about 13.9 volts to 14.1 volts.

The polarity sensor permits an automatic switching system plus eliminating the threat of damage in the event the output is hooked up backwards.

The voltage sensor for the external battery works on the same principal as the internal voltage sensor. This vehicular battery charger can charge external batteries up to 100 volts, if necessary, especially in an emergency. However, it's main use will be for 12 volt systems. But, it can easily charge 24 through 48 volt systems.

The overload protector limits the output current on external to whatever level that it is adjusted for.

The ammeter shows how much current is being used from this charger's output on external.

The voltmeter serves as a visible guide for the charger's output voltage on external.

BRIEF DESCRIPTION OF THE DRAWING

This vehicular battery charger uses either section A or section B (shown within the broken lines) but never both at the same time. The drawing shows very little of the vehicle's wiring because of the tremendous difference in the wiring of different makes and models. However, this affects only the installation of the battery charger in the different vehicles, NOT the way the battery charger works.

DETAILED DESCRIPTION

My invention is an apparatus for charging batteries, referred to throughout the embodiment as vehicular battery charger, battery charger, or simply, charger.

In order to help simplify the explaining as well as the understanding of this battery charger's electrical circuit, I have broken it into eleven categories:

1. MEANS FOR INSTALLATION AS WELL AS MEANS FOR CONNECTING TO THE BATTERY CHARGER'S OUTPUT POWER

The receptacle #5 is a permanent part of the battery charger, offering a convenient means of connecting to the battery charger's output power on external. The jumper cable #2, #3, and #4, can be made into any length desirable, 12 gauge or heavier automotive wire is recommended.

2. POLARITY SENSOR

With the jumper cable line #2, line #3, and line #4 hooked up to the external battery #1 and to the receptacle #5, voltage goes from the battery #1 through line #3 in series through the receptacle #5 and on in series through the diode #6 and from the diode #6 a portion of the voltage goes through the resistor #38 and on to the base of the transistor #39. The resistor #38 is used as a current limiter. This resistor #38 permits the voltage to vary from 3 volts to over 100 volts on the battery #1. Any voltage in this range will switch the power relay #40 from the internal battery #25 to the external battery #1. This is the way it works; the transistor #39 is a NPN type with it's emitter grounded. When the vehicle's ignition switch #31 is turned on, this puts about 12 volts positive power on one end of the relay's #40 coil, the other end of the power relay's #40 coil connects to the collector of the transistor #39. When the base of the transistor #39 receives a significant amount of voltage through the resistor #38, the transistor #39 will switch on. Since the emitter of transistor #39 is grounded, this will cause the collector of transistor #39 to drop from 12 volts down to about 2/10 of a volt, thus making a ground for the power relay's #40 coil, and this energizes the coil causing the power relay #40 to switch from the internal battery #25 to the external battery or batteries.

3. VOLTAGE SENSOR FOR EXTERNAL BATTERY

With the battery charger in operation and while charging the external battery #1, the voltage sensor works in this way; positive voltage from the external battery #1 goes in series through line #3, receptacle #5, and diode #6, from the diode #6 voltage goes through the resistor #7. (This resistor #7 is used to protect the zener diode #9 and the transistor #11 in case the potentiometer #8 happens to be adjusted all the way up to the highest voltage.) The voltage from the resistor #7 goes to the potentiometer #8, the upper end of the potentiometer #8 is grounded and the center terminal is connected to the zener diode #9, which, in this case, is a 12 volt zener diode. The potentiometer #8 becomes a voltage divider network. When the voltage exceeds 12 volts on the zener diode #9, this causes the zener diode #9 to break down and pass the voltage in excess of 12 volts on to the base of the transistor #11 (which is a NPN type) as well as to the resistor #10. The other end of the resistor #10 is connected to the ground as well as the transistor's #11 emitter. This resistor #10 is used to pass small leakage to the ground from the zener diode #9. When the base of the transistor #11 receives a significant amount of voltage from the zener diode #9 the transistor #11 will turn on, thus causing the regulator transistor #14 to turn on.

4. TRANSISTOR VOLTAGE REGULATOR

This regulator is wired for full output power (which means it remains neutral) until it receives a command from either voltage sensor. Transistor #14 is a PNP type. When the vehicle's ignition switch #31 is turned on this puts about 12 volts positive voltage to the emitter of transistor #14 as well as to one end of the resistor #13. The other end of resistor #13 connects to the base of transistor #14 as well as to one end of two resistors #12 and #37. The other end of resistor #12 connects to the collector of transistor #11. The other end of resistor #37 connects to the collector of transistor #36. When transistor #11 turns on, this pulls down the voltage on the collector of transistor #11 resulting in reduced voltage on the resistor #13 through resistor #12 and this reduces the voltage on the base of transistor #14 thus making the base more negative with respect to the emitter of transistor #14 causing this transistor #14 to turn on.

5. OUTPUT POWER TRANSISTORS

The output power transistor, or transistors, is a PNP type. (in this instance, there are two as shown in drawing.) These output power transistors #20 and #21 control the alternator's #22 field. The output power transistors have about 12 volts positive voltage applied to their emitters when the vehicle's ignition is turned on, positive voltage goes through the resistor #19 and on to the output power transistors' #20 and #21 base. The base of these transistors #20 and #21 are connected in series through the points #18 and #17 of the overload relay #42, and on in series through resistor #16 to the collector of transistor #14 as well as to the resistor #15. The other end of the resistor #15 connects to the ground. The resistor #15 is a lot stronger than the resistor #19, resulting in a negative bias on the output power transistors' #20 and #21 base, with respect to their emitters. So, the output power transistors #20 and #21 are wired to operate on full power until they receive a different command from either the transistor voltage regulator, the vehicle's regulator #27, or the overload relay #42. Going back to where the transistor #14 (the transistor voltage regulator) has turned on, this makes a more positive voltage on the collector of transistor #14 thus cutting down or removing the negative bias on the base of the output power transistors #20 and #21 causing them to reduce or cut off the output power. This transistor voltage regulator works to maintain the voltage level that the voltage sensors are set for.

6. VOLTAGE SENSOR FOR THE INTERNAL BATTERY

This voltage sensor for the internal battery #25 works on the same principal as the voltage sensor for the external battery #1. When the ignition switch #31 is turned on, positive voltage goes through the resistor #32 and on to the potentiometer #33. The upper end of the potentiometer #33 connects to the ground and the center terminal connects to the zener diode #34. The other end of the zener diode #34 connects to the base of the transistor #36 as well as to the resistor #35. The other end of the resistor #35 connects to the ground as well as to the emitter of the transistor #36. The collector of transverse #36 connects to the resistor #37 and the other end of resistor #37 connects to the base of transistor #14.

7. UTILIZATION OF THE VEHICLE'S REGULATOR

When this vehicular battery charger is installed in a vehicle, it requires revised wiring between the regulator #27 and the alternator #22. Shown in the drawing, #28 is just one example. NOT shown in the drawing is the connection from the ignition switch #31 to the ignition terminal of the regulator #27. In most cases you would not change that portion of the vehicle's wiring. (Most vehicles are not wired as shown in the drawing from the battery terminal on regulator #27 to the internal battery #25. In order to make this more simple, I've shown it direct.) If the option were chosen to use the vehicle's regulator #27, the battery charger would get most of it's operating voltage from the field terminal of said regulator #27. When the vehicle's regulator #27 is used, the output power transistors #20 and #21 operate in an unusual way. Since the output power transistors #20 and #21 are wired for full power, by varying their emitters voltage changes their output voltage, and this is what the regulator #27 does. When the voltage on the internal battery #25 reaches about 14 volts the regulator #27 cuts down on the field terminal voltage thus causing the collectors of the output power transistors #20 and #21 to reduce voltage. So, the regulator #27 regulates the transistors #20 and #21, and these transistors #20 and #21 control the voltage on the field of the alternator #22 resulting in said output power transistors #20 and #21 staying cool while charging the internal battery #25.

8. UTILIZATION OF THE VEHICLE'S ALTERNATOR

Actually, all of this battery charger's output power for charging batteries comes from the alternator #22 of the vehicle that this charger has been installed in. This battery charger controls the voltage that is applied to the field of said alternator #22. By controlling the voltage on the field, you control the output power of said alternator #22. If you increase the voltage on the alternator's #22 field, this will increase the output power of said alternator #22, if you decrease the voltage on the field, this will decrease the output power. Keep in mind if you keep the same voltage on the field and vary the speed of said alternator #22 this will also change the alternator's #22 output power. Output power from the alternator #22 goes to the center terminal #23 of the power relay #40, if the charger is charging the internal battery #25 the center terminal points #23 are connected to the upper set of points #24 of said relay #40, the upper set of points #24 connect to the internal battery #25. But, if the charger is charging the external battery #1, the center terminal points #23 are connected to the lower set of points #41, and from here the output power goes through the coil of the overload relay #42, on in series through the ammeter #43, on through the receptacle #5, and on through line #4 to the battery #1.

9. OVERLOAD PROTECTOR

This overload protector is a relay #42. Actually, it works as a current limiter since all of this battery charger's output current on external goes in series through the coil of said relay #42. This coil works as an electromagnet, the greater the load on the coil, the greater the magnetic pull on one side of the points #18, and since the tension on the point #18 is adjustable you can adjust for different output currents. For example, if it is set at 30 amps you can short out the output power, or charge a 12 volt battery or charge a 48 volt battery system. All three will go to a maximum of about 30 amps and hold at that level and this can be very useful.

10. AMMETER

On external, the ammeter #43 shows how much current is being used from the battery charger's output power.

11. VOLTMETER AND SELECTOR SWITCH

Due to the fact that this battery charger has such a wide range of output voltage, I've used a low voltage voltmeter #49 as a standard scale and a voltage divider network for the higher voltage. The selector switch #46 has two positions, up is an automatic switching system and down manually switches the battery charger, as well as adding the voltage divider network to the voltmeter #49. Then, to get the voltage you ten times the reading on the voltmeter #49 scale. It may be desirable to add a selector switch and a voltage divider network in between the cathode end of diode #6 and the upper left terminal of switch #46, for higher voltage, when the selector switch #46 is in the up position. With the selector switch #46 in the up position and hooked up to the external battery #1, positive voltage goes from the battery #1, through line #3, on through receptacle #5, on through the diode #6, on to the left top terminal of switch #46, on through switch #46, to the left center terminal of switch #46, on through the resistor #48, and on to the positive side of the voltmeter #49. (Resistor #48 is used because the voltmeter #49 I used requires it.) The negative side of voltmeter #49 connects to the ground. With the selector switch #46 in the down position, and the vehicle's ignition switch is turned on there is about 12 volts positive voltage on the right lower terminal of switch #46, from here voltage goes through switch #46, on to the right center terminal of said switch #46, on through the resistor #47, to the base of transistor #39. This makes the base of said transistor #39 more positive with respect to it's emitter, causing the transistor #39 to switch on, and this makes a negative ground for the coil of relay #40, thus causing the said relay #40 to switch from internal to external. The voltage divider network for said voltmeter #49 is wired as follows: with the selector switch #46 in the down position, voltage goes from the + terminal of receptacle #5, on through resistor #44, on to the lower left terminal of switch #46. This lower left terminal of switch #46 connects to one end of resistor #45 and the other end of resistor #45 connects to the ground. Going back to the lower left side of switch #46 (since this is where the voltage is divided) from here the voltage goes through the switch #46, on to the left center terminal of switch #46, on through resistor #48, and on to the positive side of voltmeter #49.

The following is a list of the small electronic components I used in my test model:
Diode #6—1N4005
Diodes #9 and #34—1N4742
Resistor #7—130 ohms
Resistors #10 and #35—2.2K
Resistors #12, #13, #37, #38 and #47—1K
Resistor #15—330 ohms
Resistors #16 and #32—10 ohms
Resistor #19—6.6K
Resistors #29 and #30—none (use if needed)
Resistor #44—30K
Resistor #45—3.3K
Resistor #48—15K
Transistors #11 and #36—TIP-31
Transistor #14—TIP-32
Transistors #20 and #21—2N6594
Transistor #39—TIP-33
Potentiometers #8 and #33—5K
Capacitor #26—1000 MFD
Switch #46—DPDT slide type The maximum charging rate of this battery charger, in most instances, would be between 40 and 50 amps depending on the alternator of the vehicle that this battery charger is installed in, so this battery charger will easily charge other vehicles batteries, from 12 volt through 48 volt systems with either positive or negative ground.

Various changes may be made in the details of construction without departing from the spirit and scope of my invention as defined by the appended claims.

Having thus described my invention, I claim:

1. A vehicular battery charger comprising in combination:
means for installation, means for convenient connecting and or disconnecting to this vehicular battery charger's output power which consists of an electrical receptacle with at least three individual conductors, further consisting at least a three conductor wiring harness jumper cable with a plug on one end to mate with said electrical receptacle and the other end of said jumper cable is equipped with a convenient means for connecting and or disconnecting to or from the external battery or batteries to be charged, said three conductor jumper cable has two of said three conductors connected together on the external battery(s) plus end, one of said two conductors is a feed-back line for a battery charger polarity sensor as well as a feed-back line for a battery charger voltage sensor for said external battery(s), a jumper cable feed-back line connecting to the center terminal on said receptacle also said center terminal on said receptacle is connected to the anode end of a first diode and the upper terminal of said receptacle is connected to a battery charger ground and the lower terminal of said receptacle is connected to the proper side of a battery charger ammeter;

a polarity sensor which consists of a first rectifier type diode, a first resistor, a first transistor of the NPN type and a heavy duty power relay all being electrically connected as a functional part of this battery charger, said first diode anode end connected to the center terminal of said receptacle and the cathode end connected to one end of the first resistor and the other end of said first resistor connected to the base of the first transistor, the emitter of said transistor is grounded and the collector is connected to one end of the power relay's coil and means for powering the other end of said coil from an internal battery plus terminal the negative terminal of said internal battery is connected to said ground, the upper set of points of said power relay is connected to the positive terminal of said internal battery, the center set of points of said power relay is connected to the output terminal of the vehicle's alternator and is means for receiving said alternator's output power, the lower set of points of said power relay is connected to one end of a battery charger overload relay coil, when said battery charger is connected to an external battery said polarity sensor senses the polarity of said external battery if said polarity is not proper said charger will not respond, upon proper polarity said first diode passes voltage on to the base of said first transistor when said base receives a significant amount of positive voltage said transistor will switch on thus causing said power relay to switch said charger's output power to said external battery or batteries, when said external battery or batteries is disconnected said battery charger automatically resumes maintaining the charge on said internal battery;

a voltage sensor for the external battery which consists of second, third and fourth resistors, one potentiometer, a first zener diode, and a second transistor of the NPN type all being electrically connected as a functional part of this battery charger, said charger's second resistor connected at the point of in between said first diode and said first resistor and the other end of said second resistor connected to the lower end of the first potentiometer, the upper end of said potentiometer is grounded and the center terminal is connected to the first zener diode cathode end, and the anode end is connected to base of the second transistor as well as to one end of the third resistor the other end of said resistor is connected to the ground as well as the emitter of the said second transistor and the collector of said second transistor is connected to one end of the fourth resistor and the other end of said fourth resistor is connected to the base of the third transistor, said potentiometer is used as a voltage divider network when the voltage exceeds twelve volts on said first zener diode said zener diode will break down and pass the voltage in excess of twelve volts on in series to the base of said second transistor as well as to one end of said third resistor, so when said base of said second transistor receives a significant amount of positive voltage from the zener diode said second transistor will turn on, said external battery voltage sensor senses the voltage level of said external battery or batteries, said voltage sensor is adjustable being capable of sensing up to 100 volt range and when a predetermined voltage level is reached, said sensor's transistor turns on thus providing means for a sensed, controlled, pre-set charge level for said external battery or batteries;

a transistor voltage regulator which consists of fifth, sixth and seventh resistors, and a third transistor of the PNP type all being electrically connected as a functional part of this battery charger, said charger's fifth resistor is connected across the base and the emitter of said third transistor, one end of the sixth resistor as well as one end of the seventh resistor is connected to the collector of said third transistor, the other end of said sixth resistor is connected to the ground, the other end of said seventh resistor is connected to the upper terminal of said charger's overload relay points, said voltage regulator is in a neutral condition until said regulator receives a command from said external voltage sensor, upon said external voltage sensor's transistor turning on pulls down the voltage on the collector of said sensor's transistor which reduces the voltage on the base of said regulator's transistor thus making said base more negative with respect to the emitter of said transistor causing said regulator's transistor to turn on;

the output power transistors which consist of eighth, ninth and tenth resistors, one capacitor, and fourth and fifth transistors of the PNP type all being electrically connected as a functional part of this battery charger, said charger's lower terminal of said overload relay points is connected to the base of each of the fourth and fifth power transistor, the collectors of said fourth and fifth power transistors are connected to the field terminal of said vehicle's alternator and the emitter of said fourth transistor is connected in series with the eighth resistor to the power supply, the emitter of said fifth transistor is connected in series with the ninth resistor to the power supply, the capacitor is connected across said power supply and said ground, the tenth resistor is connected across the base and the emitter of said fifth transistor, said output power transistors are wired with a negative bias and will produce full output power until they receive a significant amount of positive voltage either from said transistor voltage regulator or from the opening of said overload relay points thus causing said output power transistors to reduce or cut off their output power, in combination, when said external voltage sensor senses a pre-set voltage level, said sensor's transistor turns on thus causing said regulator's transistor to turn on thus causing said power transistors to reduce or cut off their output power, the function of said output power transistors is to control the vehicle alternator's output power and does this by controlling said alternator's field voltage.

2. A vehicular battery charger, as set forth in claim 1, further comprising:
a voltage sensor for the internal battery which consists of the vehicle's ignition switch, eleventh, twelfth and thirteenth resistors, one potentiometer, a second zener diode, and a sixth transistor of the NPN type, all being electrically connected as a functional part of this battery charger, said charger's eleventh resistor is connected in series from the lower terminal of the second potentiometer and to the vehicle's ignition switch and means for powering said switch from said internal battery, the upper terminal of said potentiometer is grounded and the center terminal is connected to the cathode end of the second zener diode with the anode end of said diode connected to the base of the sixth transistor as well as to one end of the twelfth resistor and the other end of said resistor is connected to the ground as well as the emitter of said transistor, the thirteenth resistor is connected in series between the collector of said sixth transistor and the base of said third transistor, when the base of said sixth transistor receives a significant amount of positive voltage from said second zener diode, said sixth transistor will switch on, thus causing said regulator transistor to turn on, said internal voltage sensor senses the voltage of said internal battery, said sensor is adjustable, thus permitting said charger to charge said internal battery to a pre-set voltage and after this pre-set voltage level has been reached said battery charger will automatically taper down to maintain the pre-set voltage level on said internal battery.

3. A vehicular battery charger, as set forth in claim 2, further comprising:
utilization of the vehicle's conventional type regulator excluding all alternator built-in type regulators, said regulator having at least two terminals, one of said terminals known as the ignition terminal and the second of said terminals known as the field terminal, said regulator having ground means connected to ground, means for said regulator to receive its operating voltage from said internal battery and further means for said battery charger to receive its operating voltage from said field terminal of said regulator, means for combining said regulator and said battery charger to maintain a pre-set voltage level on said internal battery.

4. A vehicular battery charger, as set forth in claim 3, further comprising:
utilization of the vehicle's alternator, which consists of said vehicle's alternator, said alternator having a field winding with at least one field terminal, and an output power terminal, said alternator having ground means connected to said ground, said alternator's field terminal is connected to the collectors of said fourth and fifth power transistors, means for a controlled current path from said collectors of said output power transistors to said field terminal on said alternator which said current path is used to control said alternator's field winding voltage, said alternator's output power terminal is connected to the center set of points on said power relay, means for said power relay to receive the output power from said alternator and further means for said power relay to transfer said alternator's output power either to said internal battery or to said external battery or batteries, means for charging said external battery or batteries, twelve volt through forty-eight volt systems.

5. A vehicular battery charger, as set forth in claim 4, further including:

an overload protector which consists of a relay which has an outstandingly heavy coil winding with one set of adjustable tension single points, all being electrically connected as a functional part of this battery charger, the overload relay's coil is connected in series from the lower set of points on said power relay to one side of said charger's ammeter, said overload relay's points is connected in series from said seventh resistor to the base of each of said fourth and fifth power transistor, means for a controlled current path from the collector of said regulator's transistor through said overload relay's points to the base of each of said fourth and fifth power transistor, further means for inhibiting said current path when said charger's output current on external reaches a pre-determined current level and further means for regulating said charger's output current at said predetermined current level.

6. A vehicular battery charger, as set forth in claim 5, further comprising:
an ammeter which consists of an ammeter electrically connected as a functional part of this battery charger, said ammeter is connected in series between said overload relay's coil and the lower terminal on said receptacle, the function of said ammeter is to show visibly how much current is being used from said battery charger's output while on external.

7. A vehicular battery charger, as set forth in claim 6, further comprising:
a voltmeter and a selector switch which consists of one voltmeter, fourteenth, fifteenth, sixteenth and seventeenth resistors all being electrically connected as a functional part of this battery charger said charger's fourteenth resistor is connected in series between the lower terminal on said receptacle and the left lower terminal on said selector switch, the fifteenth resistor is connected in series between said left lower terminal on said selector switch and to the ground, the negative side of the voltmeter is grounded, the plus side of said voltmeter is connected in series with the sixteenth resistor and to the left center terminal of said selector switch, the left upper terminal of said selector switch is connected to the cathode end of the first diode, the right lower terminal of said selector switch is connected to receive power from the plus terminal on said internal battery, the right center terminal of said selector switch is connected in series with the seventeenth resistor and to the base of the first transistor, the left side of said selector switch is used as a voltage divider network for said voltmeter and the right side is used as a manual switch for external power, said seventeenth resistor is used as a current limiter to protect the said first transistor when manually switches to external, the main functions of said voltmeter are, one—a visible guide while adjusting the external voltage sensor to a set voltage level for charging external batteries, two—visibly show the voltage level of said external batteries being charged, and three—visibly shows the output voltage of said battery charger when said selector switch is manually switched to external, the two functions of said selector switch are, one—is to manually switch said battery charger's output power to external, two—when manually switched to external the voltage reading on said voltmeter is reduced, to get the actual voltage take ten times said voltmeter reading.

* * * * *